(12) United States Patent  
Kudo et al.

(10) Patent No.: US 8,274,196 B2
(45) Date of Patent: Sep. 25, 2012

(54) CONTROL APPARATUS FOR VIBRATION WAVE DRIVEN APPARATUS

(75) Inventors: Shinya Kudo, Tokyo (JP); Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/259,075

(22) PCT Filed: Apr. 8, 2010

(86) PCT No.: PCT/JP2010/002587
§ 371 (c)(1),
(2), (4) Date: Sep. 22, 2011

(87) PCT Pub. No.: WO2010/116751
PCT Pub. Date: Oct. 14, 2010

(65) Prior Publication Data
US 2012/0025743 A1    Feb. 2, 2012

(30) Foreign Application Priority Data

Apr. 10, 2009  (JP) .................. 2009-096146
Feb. 9, 2010    (JP) .................. 2010-026728

(51) Int. Cl.
*H01L 41/09*    (2006.01)
*H01L 41/107*   (2006.01)
(52) U.S. Cl. ............... 310/316.01; 310/316.02

(58) Field of Classification Search ............. 310/316.01, 310/316.02
See application file for complete search history.

(56) References Cited

U.S. PATENT DOCUMENTS

| 6,064,140 A * | 5/2000 | Zumeris ................. 310/323.02 |
| 7,755,251 B2 * | 7/2010 | Kudo ............................ 310/317 |
| 2002/0121869 A1 * | 9/2002 | Kataoka et al. ............... 318/114 |
| 2004/0189150 A1 | 9/2004 | Yamamoto |
| 2005/0242686 A1 | 11/2005 | Yamamoto |

FOREIGN PATENT DOCUMENTS

| JP | 2-299479 A | 12/1990 |
| JP | 6-233560 A | 8/1994 |
| JP | 2000-78866 A | 3/2000 |
| JP | 2004-320846 A | 11/2004 |
| JP | 2005-245055 A | 9/2005 |
| JP | 2007-124156 A | 5/2007 |

\* cited by examiner

*Primary Examiner* — Thomas Dougherty
(74) *Attorney, Agent, or Firm* — Canon U.S.A., Inc. IP Division

(57) ABSTRACT

A control apparatus detects the relative position between a vibration member and a driving-member-side vibration detection portion on the basis of a signal that shows a vibrational state of the vibration member and a signal output from the driving-member-side vibration detection portion, the driving-member-side vibration detection portion being provided on a driving member and detecting a vibration of the driving member.

20 Claims, 10 Drawing Sheets

[Fig. 1A]
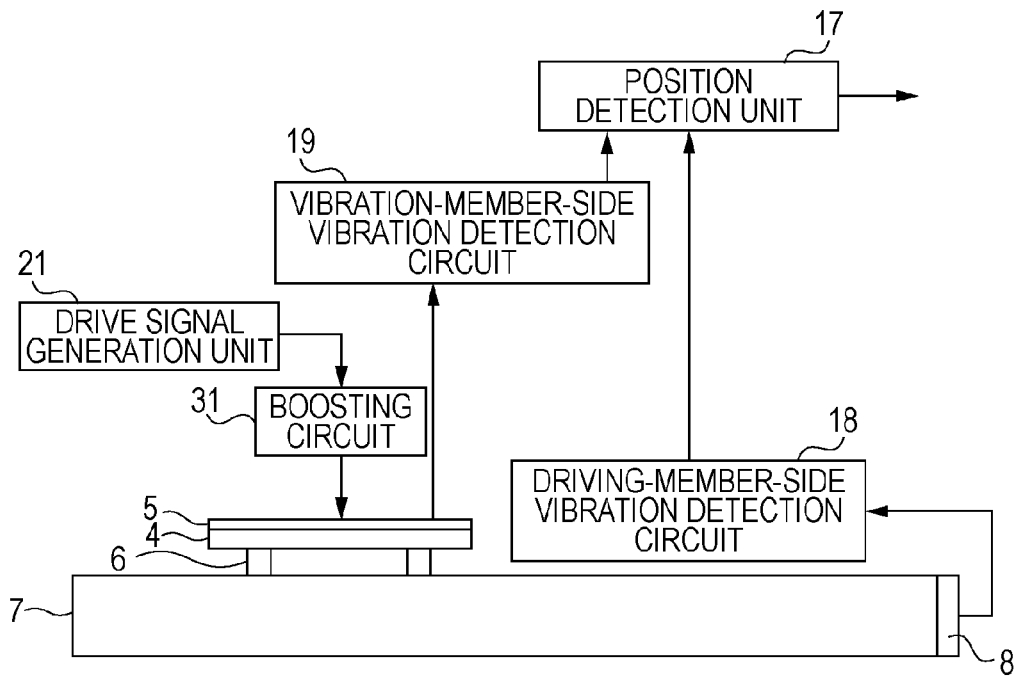
[Fig. 1B]
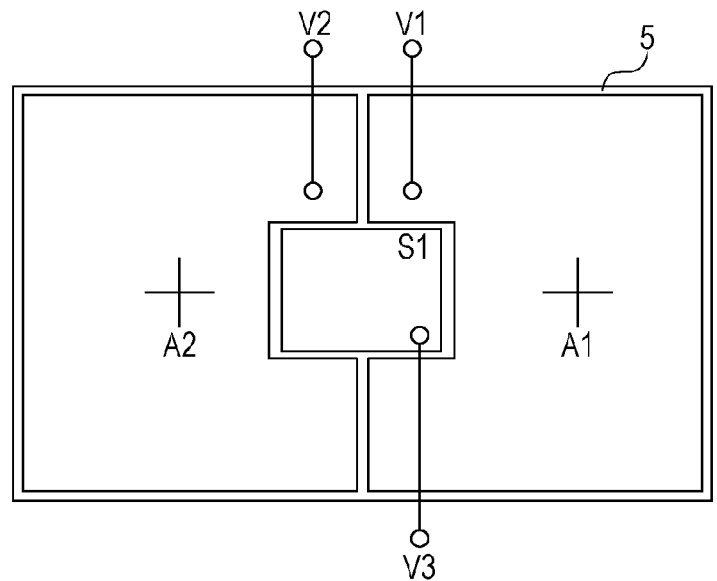

[Fig. 2]
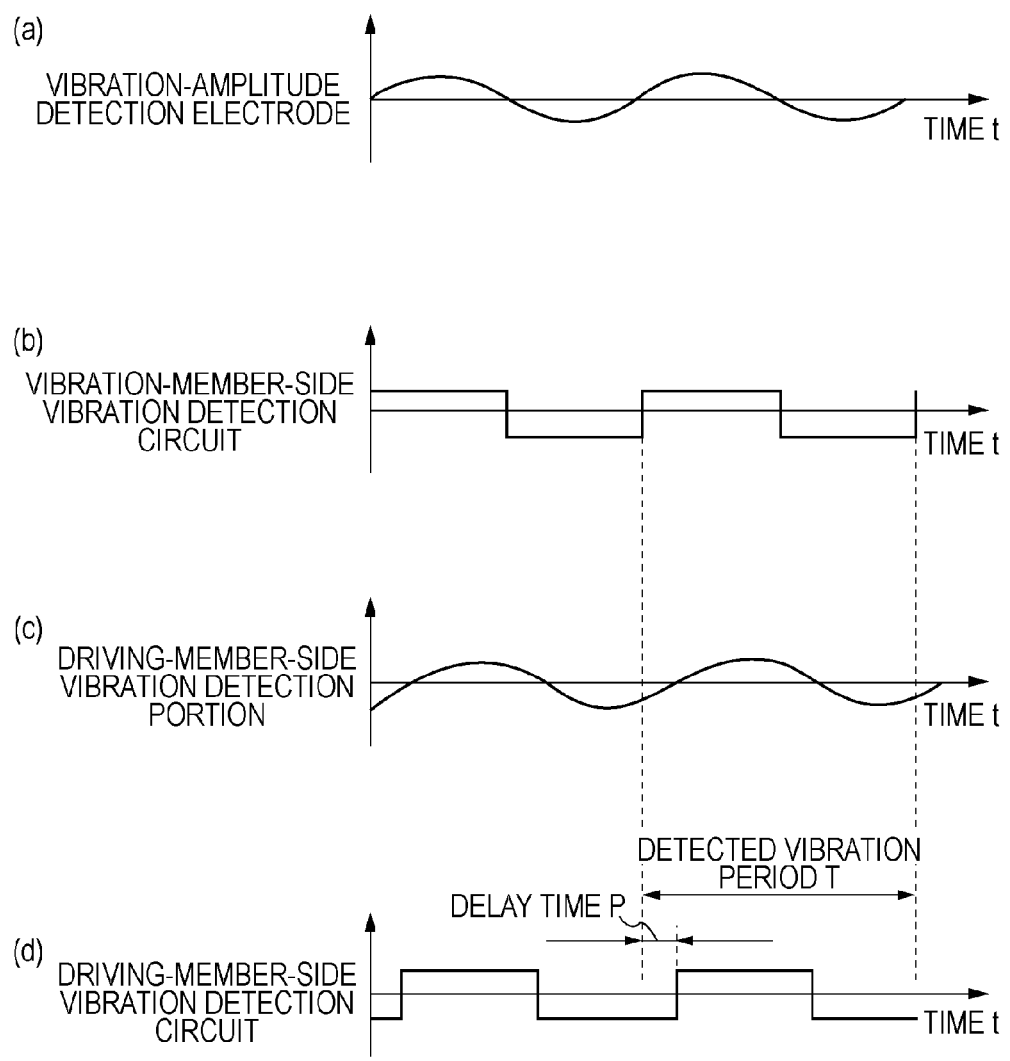

[Fig. 3]
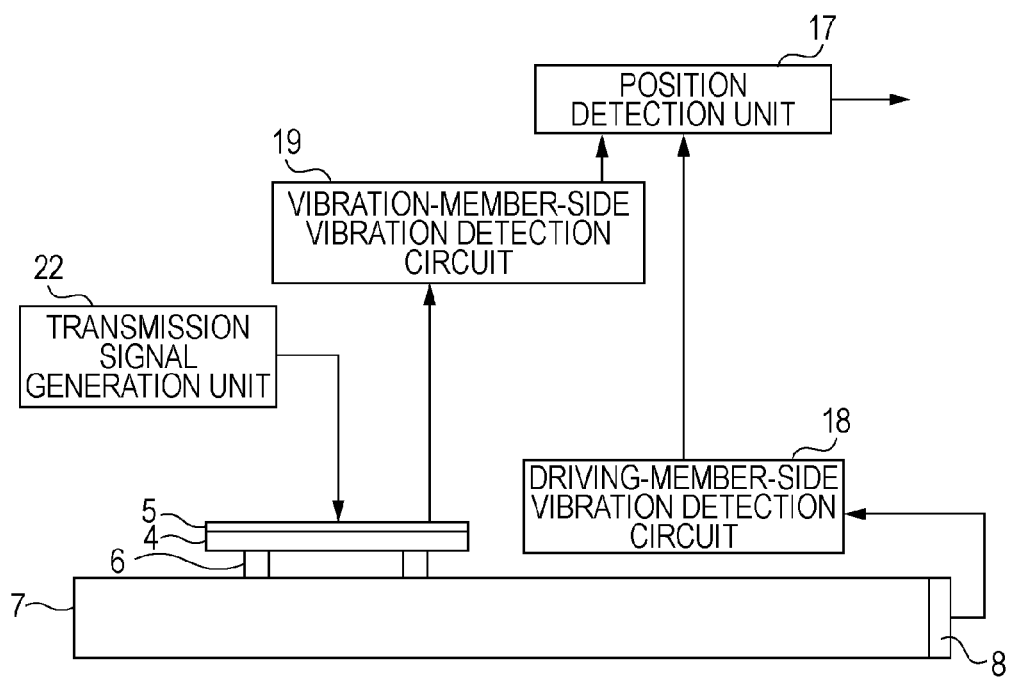

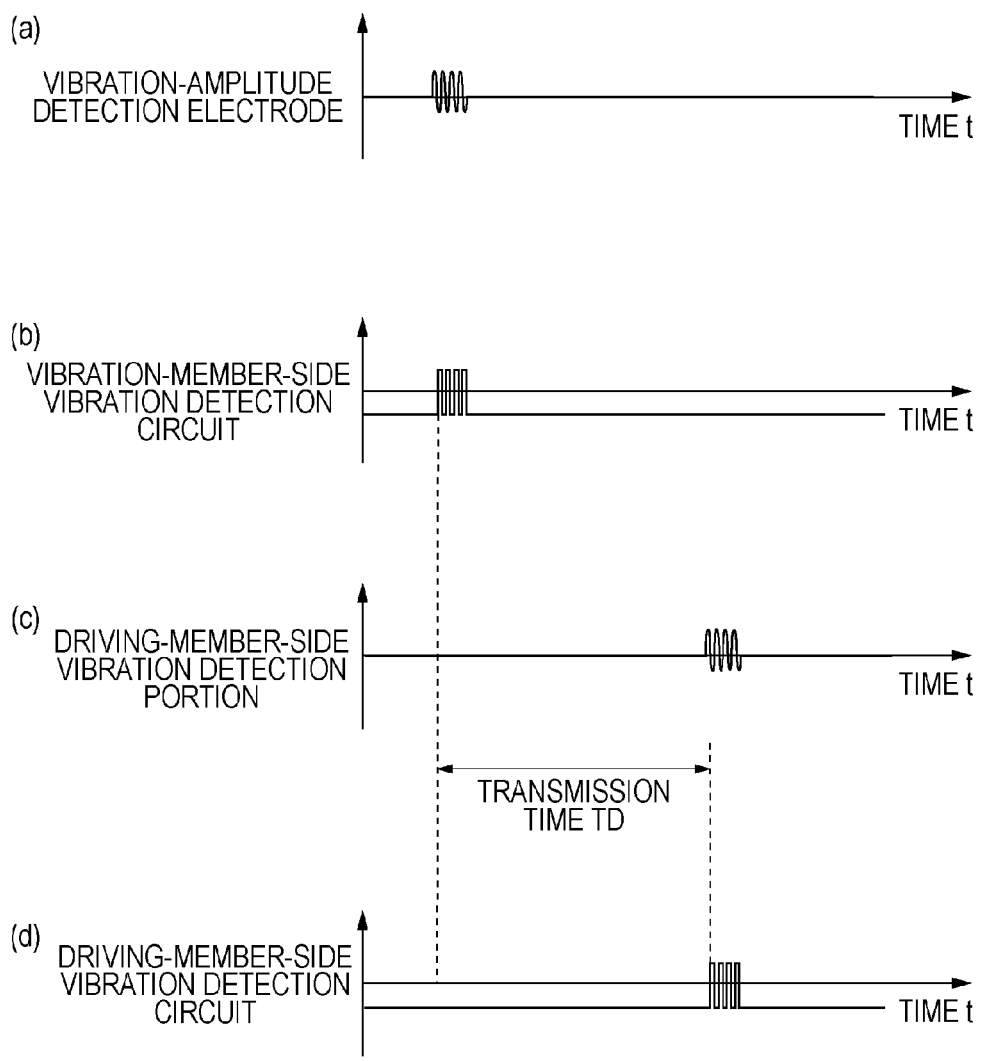
[Fig. 4]

[Fig. 5]
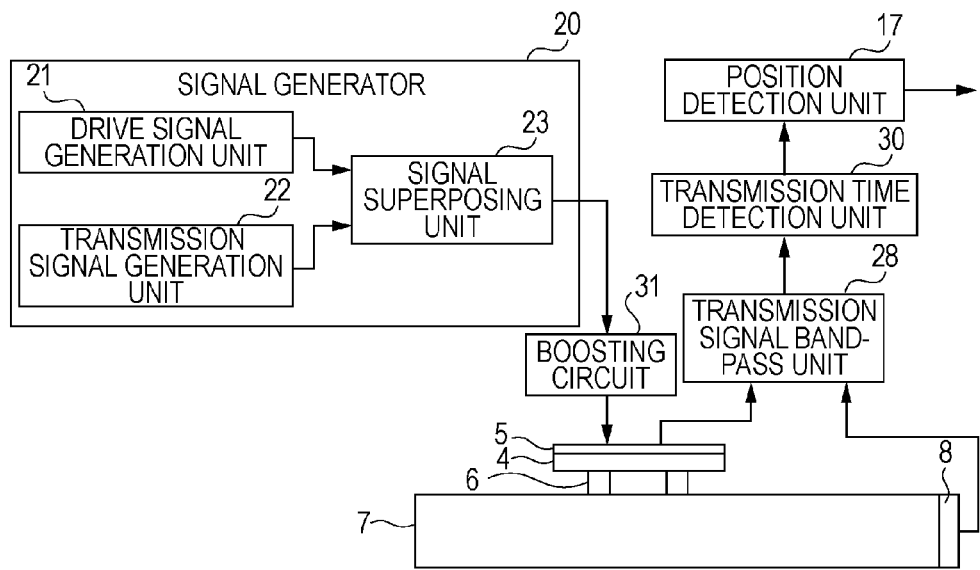
[Fig. 6]
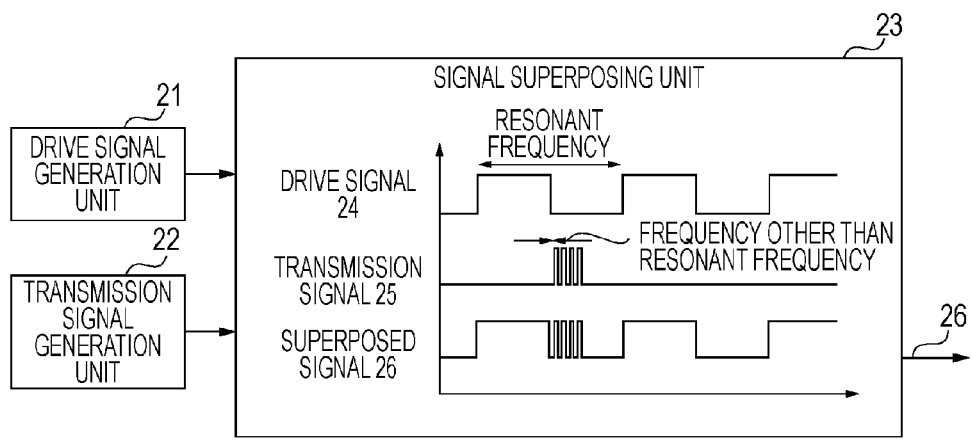

[Fig. 7]
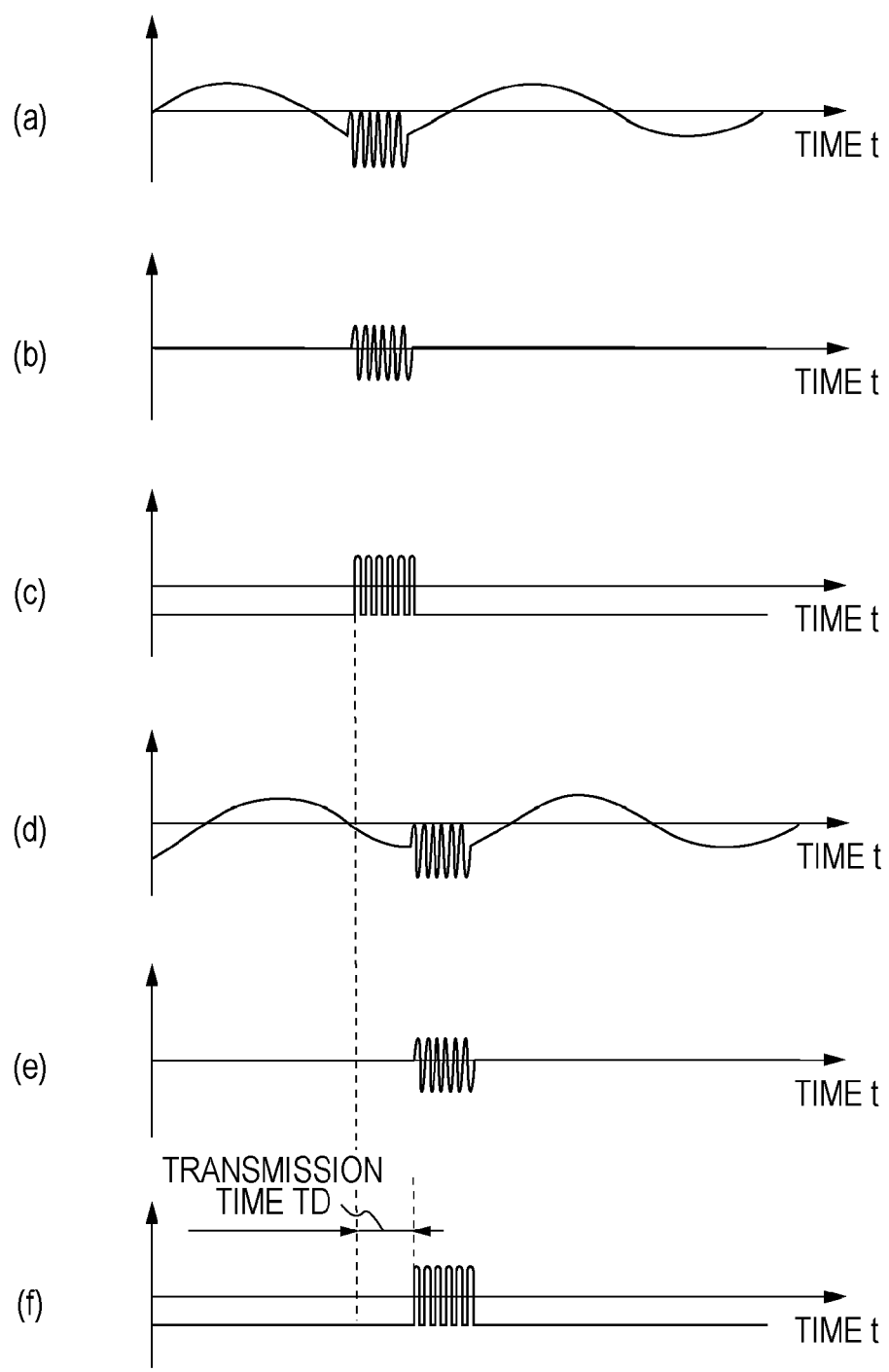

[Fig. 8]
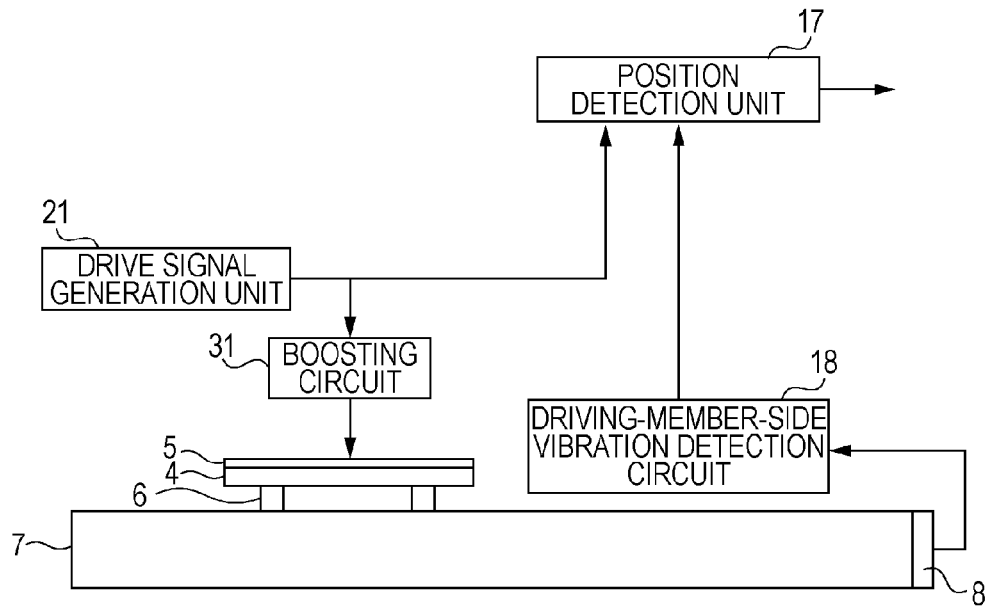
[Fig. 9]
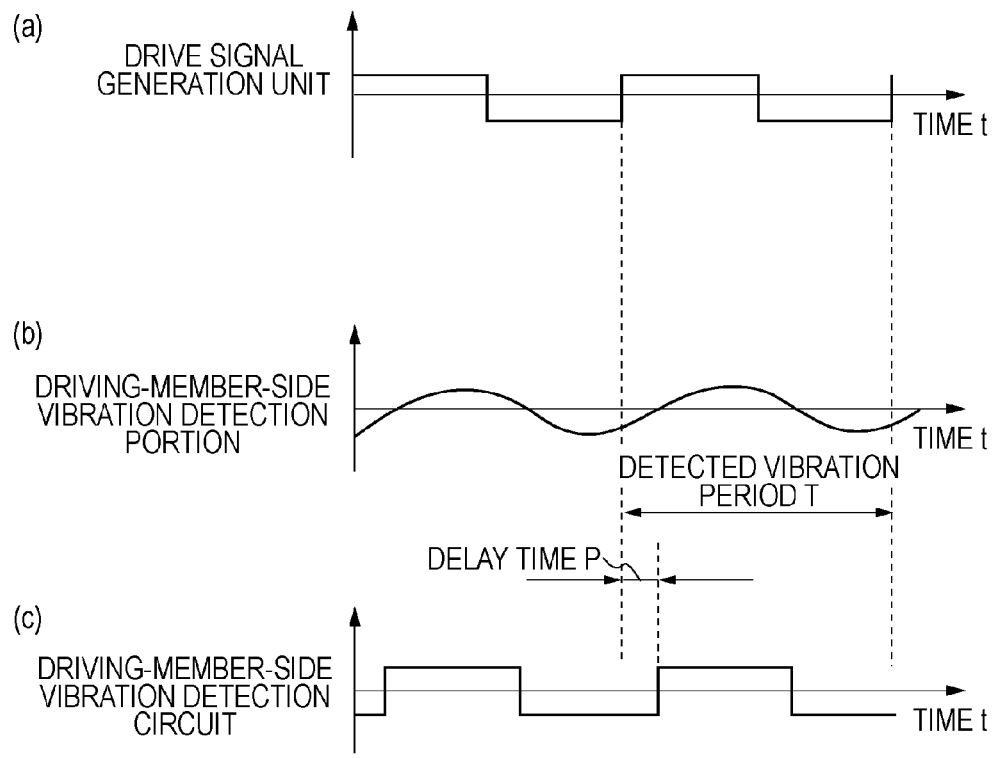

[Fig. 10]
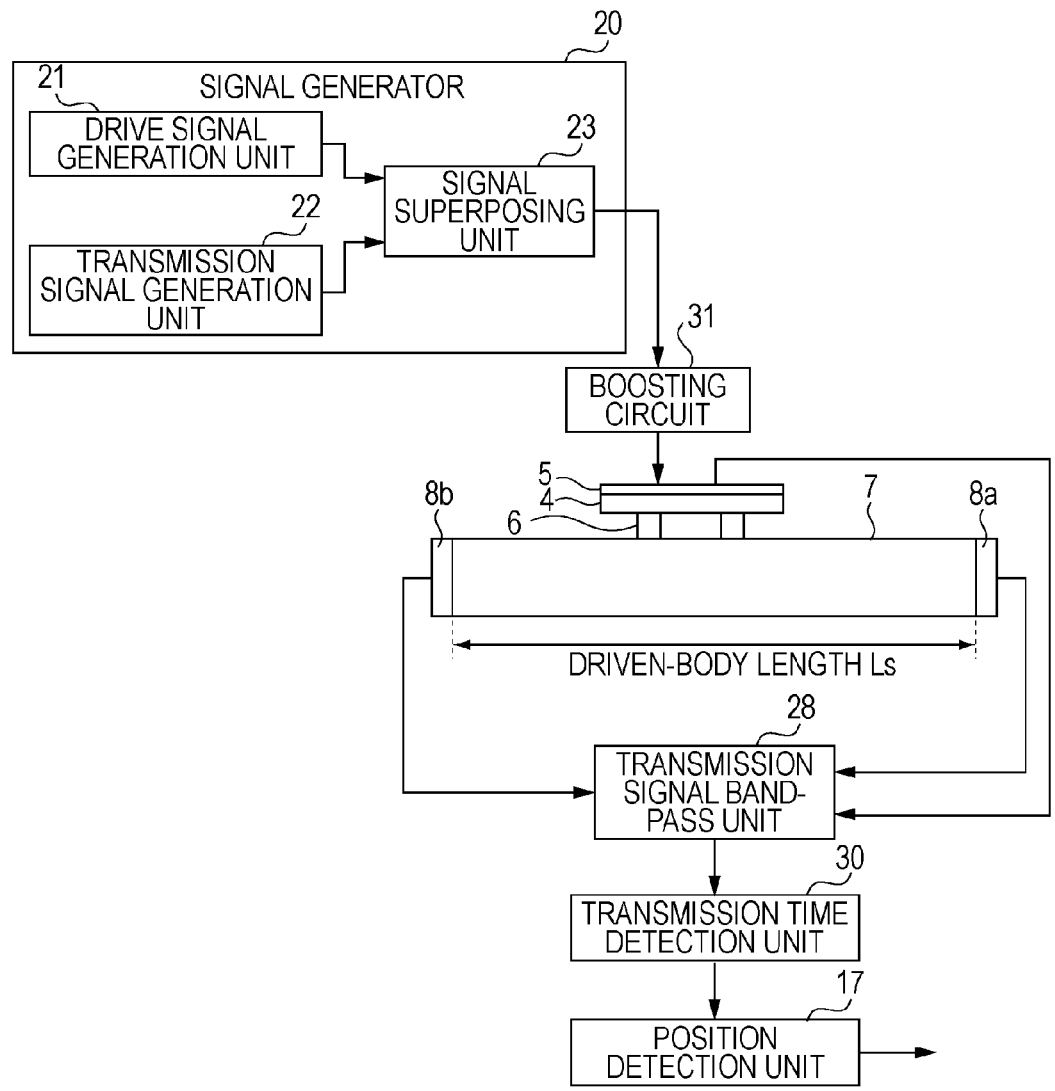

[Fig. 11]
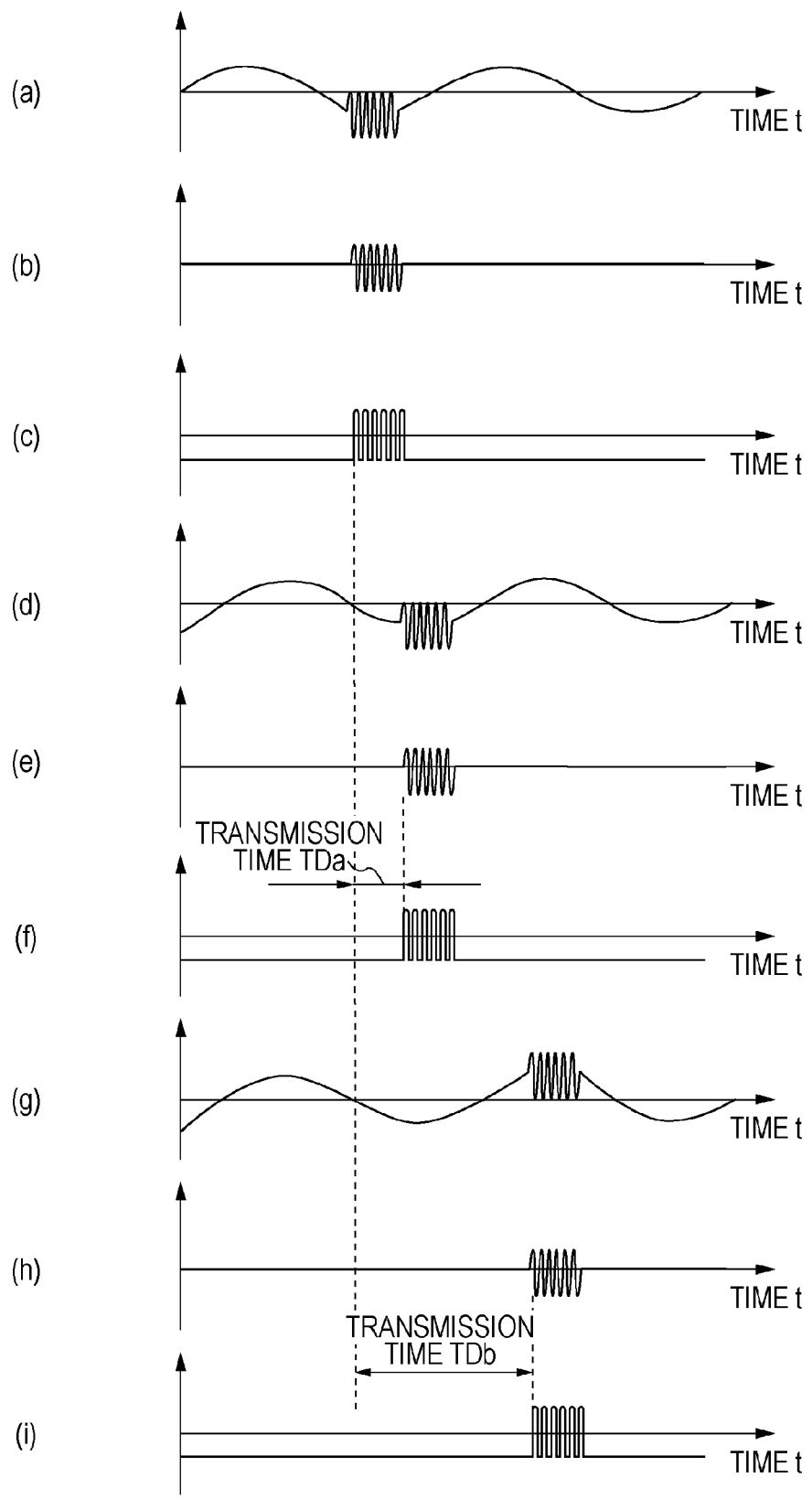

[Fig. 12A]
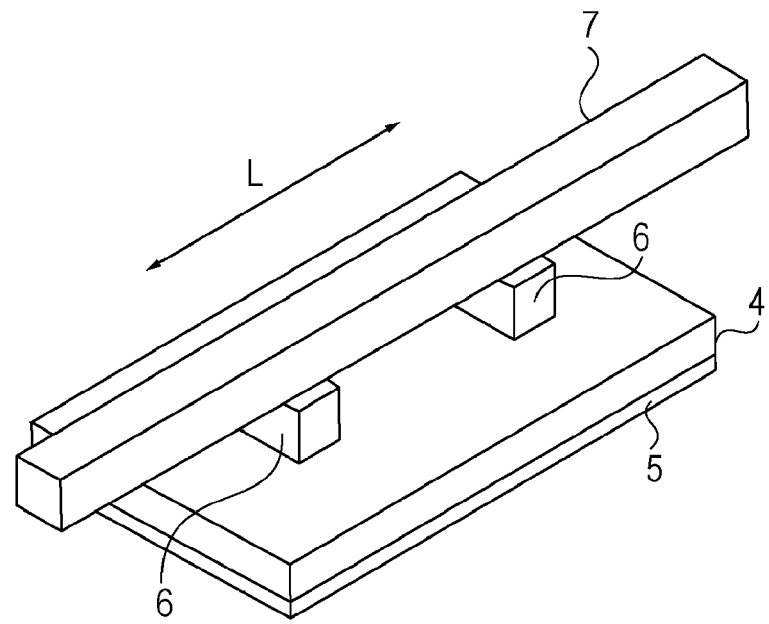
[Fig. 12B]
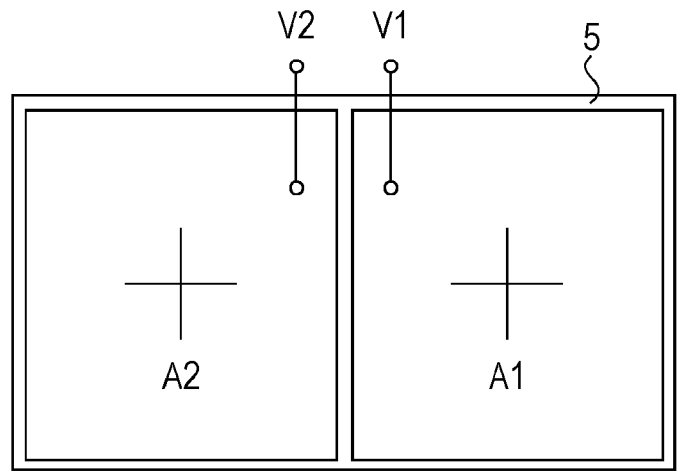

CONTROL APPARATUS FOR VIBRATION WAVE DRIVEN APPARATUS

TECHNICAL FIELD

The present invention relates to control apparatuses for vibration wave driven apparatuses. More specifically, the present invention relates to a control apparatus for detecting the relative position between a vibration member and a driving member included in the vibration wave driven apparatus.

BACKGROUND ART

Various vibration wave driven apparatuses that drive a driving member by causing a certain mass point to perform elliptic motion have been proposed. Japanese Patent Laid-Open No. 2004-320846 describes a basic structure of a vibration wave driven apparatus. FIGS. 12A and 12B show an exterior perspective view illustrating the structure of the vibration wave driven apparatus described in Japanese Patent Laid-Open No. 2004-320846. As show in FIG. 12A, the vibration wave driven apparatus includes a vibration member including a rectangular plate-shaped elastic member 4 made of a metal material. A piezoelectric element 5, which is an electro-mechanical energy conversion element, is bonded to a back surface of the elastic member 4. A plurality of projection portions 6 are provided on a top surface of the elastic member 4 at predetermined positions.

In this structure, an alternating voltage is applied to the piezoelectric element 5, so that bending vibration of the elastic member 4 in a second vibration mode along the long-side direction thereof and bending vibration of the elastic member 4 in a first vibration mode along the short-side direction thereof are simultaneously generated. As a result, elliptic motion is excited in the projection portions 6. A driving member 7 is brought into pressure contact with the projection portions 6 so that the driving member 7 can be linearly moved by the elliptic motion of the projection portions 6. In other words, the projection portions 6 function as a driving portion of the vibration member.

As shown in FIG. 12B, the piezoelectric element 5 is polarized, and includes two electrodes A1 and A2. When alternating voltages V1 and V2 in the same phase are applied to the two electrodes A1 and A2, respectively, bending vibration in the first vibration mode having two nodes that extend in a direction parallel to the long-side direction of the elastic member 4 is excited. This is the first mode vibration. When alternating voltages V1 and V2 in the opposite phases are applied to the two electrodes A1 and A2, respectively, bending vibration in the second vibration mode having three nodes that extend in a direction parallel to the short-side direction of the elastic member 4 is excited. This is the second mode vibration. The combination of the first mode vibration and the second mode vibration generates the elliptic motion of the projection portions 6. When the driving member 7 is brought into contact with the projection portions 6 in this state, the driving member 7 can be linearly moved.

According to the vibration wave driven apparatus described in Japanese Patent Laid-Open No. 2004-320846, velocity control can be performed by changing the frequency or the phases of the two alternating voltages that are applied to the piezoelectric element.

CITATION LIST

Patent Literature

PTL 1: Japanese Patent Laid-Open No. 2004-320846

SUMMARY OF INVENTION

In the vibration wave driven apparatus according to the related art, an optical linear encoder is used to detect the relative position between the vibration member and the driving member. In the case where the position is detected by the optical linear encoder, components such as a linear scale and a light-receiving element are provided to detect the position by utilizing a slit or a reflective element. Therefore, a space for arranging the above-mentioned components must be provided in an apparatus in which the vibration wave driven apparatus is installed, and it is difficult to reduce the size of the apparatus.

To solve such a problem, the present invention provides a control apparatus capable of detecting the relative position between the vibration member and the driving member without using an optical linear encoder.

According to a control apparatus for a vibration wave driven apparatus according to an embodiment of the present invention, the vibration wave driven apparatus includes a vibration member including an electro-mechanical energy conversion element and an elastic member bonded to the electro-mechanical energy conversion element and provided with a projection portion, the vibration member exciting vibrations of two vibration modes in response to a drive signal applied to the vibration member, the vibrations of the two vibration modes being combined together to generate an elliptic motion of the projection portion, and a driving member including an end portion and moving relative to the vibration member by contacting the projection portion. The control apparatus includes a driving-member-side vibration detection portion provided on the driving member to detect a vibration of the driving member, and detects the relative position between the vibration member and the driving-member-side vibration detection portion on the basis of a signal that shows a vibrational state of the vibration member and a signal output from the driving-member-side vibration detection portion.

According to the embodiment of the present invention, a vibration detector is provided on the driving member so that the relative position between the vibration member and the driving member can be detected without using an optical linear encoder or other devices.

BRIEF DESCRIPTION OF DRAWINGS

FIG. 1A is a diagram illustrating the structures of a vibration wave driven apparatus and a control apparatus according to a first embodiment.

FIG. 1B is a schematic diagram illustrating electrode areas provided on a piezoelectric element.

FIGS. 2(a) to 2(d) are graphs illustrating voltage waveforms in the vibration wave driven apparatus according to the first embodiment.

FIG. 3 is a diagram illustrating the structures of a vibration wave driven apparatus and a control apparatus according to a second embodiment.

FIGS. 4(a) to 4(d) are graphs illustrating voltage waveforms in the vibration wave driven apparatus according to the second embodiment.

FIG. 5 is a diagram illustrating the structures of a vibration wave driven apparatus and a control apparatus according to a third embodiment.

FIG. 6 is a diagram illustrating voltage waveforms in a signal superposing unit according to the third embodiment.

FIGS. 7(a) to 7(d) are graphs illustrating voltage waveforms in the vibration wave driven apparatus according to the third embodiment.

FIG. 8 is a diagram illustrating the structures of a vibration wave driven apparatus and a control apparatus according to a fourth embodiment.

FIGS. 9(a) to 9(d) are graphs illustrating voltage waveforms in the vibration wave driven apparatus according to the fourth embodiment.

FIG. 10 is a diagram illustrating the structures of a vibration wave driven apparatus and a control apparatus according to a fifth embodiment.

FIGS. 11(a) to 11(d) are graphs illustrating voltage waveforms in the vibration wave driven apparatus according to the fifth embodiment.

FIG. 12A is an exterior perspective view illustrating the basic structure of a vibration wave driven apparatus according to a related art.

FIG. 12B is another exterior view illustrating the vibration wave driven apparatus according to the related art.

DESCRIPTION OF EMBODIMENTS

First Embodiment

FIG. 1A is a diagram illustrating the structures of a vibration wave driven apparatus and a control apparatus according to a first embodiment of the present invention. According to the first embodiment of the present invention, a relative position between a vibration member and a driving-member-side vibration detection portion 8 is detected on the basis of signals showing the vibrational state of the vibration member. The signals include a signal output from a piezoelectric element 5 and a signal output from the driving-member-side vibration detection portion 8.

Control Apparatus Structure 1

The control apparatus for the vibration wave driven apparatus shown in FIG. 1A includes a drive signal generation unit 21 that applies a drive signal to the vibration wave driven apparatus. A boosting circuit 31 is connected to an output terminal of the drive signal generation unit 21, so that a signal boosted by the boosting circuit 31 is applied to the piezoelectric element 5. The boosting circuit 31 increases the voltage of the signal to a voltage at which the vibration wave driven apparatus can be operated in a frequency range that contributes to generating vibration. The piezoelectric element 5, which is an electro-mechanical energy conversion element, is bonded to a back surface of a rectangular plate-shaped elastic member 4 made of a metal material. A plurality of projection portions 6, which function as a driving portion, are provided on a front surface of the elastic member 4 at the side opposite to the surface on which the piezoelectric element 5 is bonded. A driving member 7 is in pressure contact with the projection portions 6.

As shown in FIG. 1B, the piezoelectric element 5 is provided with three electrodes A1, A2, and S1. As explained above in the description of the related art, vibrations of two vibration modes are excited by a rectangular vibration member, and are combined together to generate elliptic motion of the projection portions. The two vibration modes will now be described. When alternating voltages V1 and V2 in the same phase are applied to the electrodes A1 and A2, respectively, bending vibration in the first vibration mode (first-mode vibration) having two nodes that extend in a direction parallel to the long-side direction of the elastic member 4 is excited. The first-mode vibration is vibration in a push-up mode in which the piezoelectric element 5 moves the projection portions 6 in a direction perpendicular to the surface of the elastic member 4 to which the piezoelectric element 5 is bonded. When alternating voltages V1 and V2 in the opposite phases are applied to the electrodes A1 and A2, respectively, bending vibration in the second vibration mode (second-mode vibration) having three nodes that extend in a direction parallel to the short-side direction of the elastic member 4 is excited. The second-mode vibration is vibration in a feeding mode in which the piezoelectric element 5 mainly moves the projection portions 6 in a direction parallel to the surface of the elastic member 4 to which the piezoelectric element 5 is bonded. Thus, the drive signal at a predetermined frequency generated by the drive signal generation unit 21 is applied to the piezoelectric element 5, so that the first-mode vibration and the second-mode vibration are excited. The first-mode vibration and the second-mode vibration are combined together to generate the elliptic motion of the projection portions 6. Owing to this elliptic motion, the driving member 7 can be linearly moved relative to the vibration member.

According to the present embodiment, the driving-member-side vibration detection portion 8 for detecting the vibration of the driving member 7 is provided on the driving member 7 at one end thereof. Owing to the elliptic motion of the projection portions 6, vibration is applied to pressure-contact portions between the driving member 7 and the projection portions 6. Accordingly, the vibration of the projection portions 6 is transmitted to the driving-member-side vibration detection portion 8 through the driving member 7. The driving-member-side vibration detection portion 8 is composed of a piezoelectric element, which is an electro-mechanical energy conversion element. A driving-member-side vibration detection circuit 18 is connected to an output terminal of the driving-member-side vibration detection portion 8. The driving-member-side vibration detection circuit 18 converts an output signal from the driving-member-side vibration detection portion 8 into a binary signal using a threshold set at the central value of the output signal (central value between the maximum and minimum values of the amplitude). A position detection unit 17 is connected to an output terminal of the driving-member-side vibration detection circuit 18.

The piezoelectric element 5 shown in FIG. 1A includes a vibration-amplitude detection electrode S1 which serves as a vibration-member-side vibration detection portion for detecting a vibration amplitude. The vibration-amplitude detection electrode S1 detects the first-mode vibration and outputs a voltage V3. The vibration-amplitude detection electrode S1 has a function of detecting the vibration applied to the piezoelectric element 5. A vibration-member-side vibration detection circuit 19 shown in FIG. 1A is connected to an output terminal of the vibration-amplitude detection electrode S1. The vibration-member-side vibration detection circuit 19 converts an output signal from the vibration-amplitude detection electrode S1 into a binary signal using a threshold set at the central value of the output signal. The position detection unit 17 is also connected to an output terminal of the vibration-member-side vibration detection circuit 19. The position detection unit 17 calculates the relative position between the vibration member and the driving-member-side vibration detection portion 8 on the basis of the signals output from the driving-member-side vibration detection circuit 18 and the vibration-member-side vibration detection circuit 19. The function of the position detection unit 17 will be described below.

Position Detection Unit Function 1

The function of the position detection unit 17 will now be described with reference to FIG. 2. The position detection unit 17 has a function of detecting a phase difference between a signal representing a vibration detected by the vibration-amplitude detection electrode S1 and a signal representing a vibration signal detected by the driving-member-side vibration detection portion 8.

If the phase difference is detected, the relative position (hereinafter referred to as a distance L) between the vibration member and the driving-member-side vibration detection portion 8 can be obtained by multiplying the period of vibration that is transmitted through the material (material of the driving member 7) by the transmission speed and the phase difference and dividing the product by 360 degrees as follows:

(Distance $L$)=(Period of Vibration Transmitted Through Material)*(Speed of Transmission Through Material)*(Phase Difference)/(360 degrees)     (1)

If the signal from the vibration-amplitude detection electrode S1 is a sine wave in the time-amplitude graph as shown in part (a) of FIG. 2, a signal output from the vibration-member-side vibration detection circuit 19 is a rectangular signal obtained by converting the signal shown in part (a) of FIG. 2 into a binary signal using a threshold set at the central value thereof, as in the time-amplitude graph shown in part (b) of FIG. 2. Similarly, if the signal from the driving-member-side vibration detection portion 8 is a sine wave in the time-amplitude graph as shown in part (c) of FIG. 2, a signal output from the driving-member-side vibration detection circuit 18 is a rectangular signal obtained by converting the signal shown in part (c) of FIG. 2 into a binary signal using a threshold set at the central value thereof, as in the time-amplitude graph shown in part (d) of FIG. 2. A detected vibration period T shown in part (c) of FIG. 2 is a period of the vibration shown in FIG. 2, and can be detected by a microcomputer or a logic circuit.

The delay time P (difference between the time at which the rectangular signal is output from the vibration-member-side vibration detection circuit 19 and the time at which the rectangular signal is output from the driving-member-side vibration detection circuit 18) shown in part (d) of FIG. 2 is the time interval between the rising edge of the waveform of the signal from the vibration-member-side vibration detection circuit 19 and the rising edge of the waveform of the signal from the driving-member-side vibration detection circuit 18. The delay time P can be determined by using a counter. The detected vibration period T can also be determined by using a counter. The phase difference can be determined on the basis of the delay time P and the detected vibration period T as follows:

(Phase Difference)=(Delay Time $P$)/(Detected Vibration Period $T$)     (2)

Thus, the phase difference can be detected using a counter and a logic circuit. The phase difference can also be determined by comparing the signals output from the vibration-amplitude detection electrode S1 and the driving-member-side vibration detection portion 8 using a D/A converter.

The phase difference can also be calculated for signal components with different periods included in the signals from the driving-member-side vibration detection circuit 18 and the vibration-member-side vibration detection circuit 19 by comparing the signal components with the same periods with each other. In the case where the thus-obtained phase difference information is used to determined the distance L, the detection accuracy can be increased. Alternatively, the relationship between the relative position between the vibration member and the driving-member-side vibration detection portion 8 and the phase difference between the vibrations detected by the vibration-amplitude detection electrode S1 and the driving-member-side vibration detection portion 8 can be measured and stored in a memory (not shown) in advance. In such a case, the relative position can be determined on the basis of the relationship stored in the memory. In this case, the relative position between the vibration member and the driving-member-side vibration detection portion 8 can be defined as a distance between an end of one of the projection portions 6 and the driving-member-side vibration detection portion 8 or a distance between a central position of the projection portions 6 and the driving-member-side vibration detection portion 8. Thus, the relative position can be set arbitrarily.

As described above, according to the present embodiment, the relative position between the vibration member and the driving-member-side vibration detection portion 8 can be determined by detecting the phase difference using the signal output from the vibration-member-side vibration detection portion that detects the vibration of the vibration member and the driving-member-side vibration detection portion 8 that detects the vibration of the driving member 7.

Second Embodiment

According to the first embodiment, the distance L is detected while the driving-member-side vibration detection portion 8 is being moved relative to the vibration member. In the present embodiment, the position detection is performed while the vibration member and the driving-member-side vibration detection portion 8 are stationary and are not being moved relative to each other.

The structures of the vibration wave driven apparatus and the control apparatus according to the present embodiment shown in FIG. 3 are similar to those of the first embodiment except for the functions of a transmission signal generation unit 22 and a position detection unit 17 shown in FIG. 3. FIG. 3 is a diagram illustrating the structure used when the position detection is performed at a time different from the time when a driving member 7 is being driven. At the time when the driving member 7 is driven, other circuits for driving the driving member 7 are used.

Control Apparatus Structure 2

The control apparatus for the vibration wave driven apparatus shown in FIG. 3 includes the transmission signal generation unit 22 that applies a transmission signal to the vibration wave driven apparatus. A piezoelectric element 5 is connected to an output terminal of the transmission signal generation unit 22. The signal output from the transmission signal generation unit 22 has such a frequency that the signal does not contribute to the relative movement between the vibration member and the driving member 7. The signal is applied to the piezoelectric element 5 by the transmission signal generation unit 22, and vibration of projection portions 6 is excited accordingly. The vibration of the projection portions 6 is transmitted to a driving-member-side vibration detection portion 8 through a driving member 7. The driving-member-side vibration detection portion 8 is provided on the driving member 7 at an end thereof to detect the vibration of the driving member 7. The driving-member-side vibration detection portion 8 is composed of a piezoelectric element, which is an electro-mechanical energy conversion element. A driving-member-side vibration detection circuit 18 is connected to an output terminal of the driving-member-side vibration detection portion 8. The driving-member-side vibration detection circuit 18 converts an output signal from the driving-member-side vibration detection portion 8 into a binary signal using a threshold set at the central value of the output signal. The position detection unit 17 is connected to an output terminal of the driving-member-side vibration detection circuit 18.

Position Detection Unit Function 2

The function of the position detection unit 17 will now be described with reference to FIG. 4. The position detection unit 17 has a function of detecting a time difference (vibration transmission time TD) between the time at which the vibration is detected by the vibration-amplitude detection electrode S1 and the time at which the vibration is detected by the driving-member-side vibration detection portion 8.

If a signal in the time-amplitude graph shown in part (a) of FIG. 4 is output from the vibration-amplitude detection electrode S1, the signal output from the vibration-member-side vibration detection circuit 19 is a rectangular signal obtained by converting the signal shown in part (a) of FIG. 4 into a binary signal using a threshold set at the central value thereof, as in the time-amplitude graph shown in part (b) of FIG. 4. Similarly, if a signal in the time-amplitude graph shown in part (c) of FIG. 4 is output from the driving-member-side vibration detection portion 8, the signal output from the driving-member-side vibration detection circuit 18 is a rectangular signal obtained by converting the signal shown in part (c) of FIG. 4 into a binary signal using a threshold set at the central value thereof, as in the time-amplitude graph shown in part (d) of FIG. 4.

The time difference between the time at which the vibration is detected by the vibration-amplitude detection electrode S1 and the time at which the vibration is detected by the driving-member-side vibration detection portion 8 is equal to the transmission time TD (time difference between the time at which the rectangular signal is output from the vibration-member-side vibration detection circuit 19 and the time at which the rectangular signal is output from the driving-member-side vibration detection circuit 18) shown in part (c) of FIG. 4. The transmission time TD is the time interval between the rising edge of the waveform of the signal from the vibration-member-side vibration detection circuit 19 and the rising edge of the waveform of the signal from the driving-member-side vibration detection circuit 18. The transmission time TD can be determined by using a counter. The vibration-member-side vibration detection circuit 19 and the driving-member-side vibration detection circuit 18 are composed of a counter and a logic circuit. The distance L can be obtained by multiplying the transmission time TD by the speed of transmission through the material as follows:

(Distance $L$)=(Transmission Time $TD$)*(Speed of Transmission Through Material) \qquad(3)

Thus, according to the present embodiment, a signal with such a frequency that the signal does not contribute to the relative movement between the vibration member and the driving member 7 is applied to the piezoelectric element 5. Then, the time difference (transmission time TD) between the time at which the vibration is detected by the vibration-amplitude detection electrode S1 and the time at which the vibration is detected by the driving-member-side vibration detection portion 8 is determined on the basis of the signal output by the vibration-amplitude detection electrode S1 and the signal output by the driving-member-side vibration detection portion 8. Since the time difference is determined in the above-described manner, the relative position between the vibration member and the driving-member-side vibration detection portion 8 can be determined even when the vibration wave driven apparatus is in a stationary state.

Third Embodiment

According to a third embodiment, the distance L is determined by superposing a vibration other than the vibration that contributes to the relative movement between the vibration member and the driving member 7 (vibration that does not contribute to the relative movement) on the vibration that contributes to the relative movement.

The structure of a control apparatus for a vibration wave driven apparatus according to the present embodiment will be described with reference to FIG. 5. A signal generation unit 20 shown in FIG. 5 includes a drive signal generation unit 21, a transmission signal generation unit 22, and a signal superposing unit 23 connected to output terminals of the drive signal generation unit 21 and the transmission signal generation unit 22. The signal superposing unit 23 superposes the signal from the drive signal generation unit 21 on the signal from the transmission signal generation unit 22. A boosting circuit 31 is connected to an output terminal of the signal superposing unit 23, so that a signal boosted by the boosting circuit 31 is applied to a piezoelectric element 5. The signal output from the transmission signal generation unit 22 has such a frequency that the signal does not contribute to the relative movement between the vibration member and the driving member 7.

A superposing process performed by the signal superposing unit 23 will be described with reference to FIG. 6. In FIG. 6, the waveform of the signal from the drive signal generation unit 21 is shown as a drive signal 24, and the waveform of the signal from the transmission signal generation unit 22 is shown as a transmission signal 25. A superposed signal 26 is obtained by superposing the drive signal 24 on the transmission signal 25, and is output from the signal superposing unit 23.

Similar to the first embodiment, a driving-member-side vibration detection portion 8 for detecting the vibration of a driving member 7 is provided on the driving member 7 at an end thereof. The driving-member-side vibration detection portion 8 is composed of a piezoelectric element, and a transmission-signal band-pass unit 28 is connected to an output terminal of the driving-member-side vibration detection portion 8.

The transmission-signal band-pass unit 28 has a function of allowing only a signal component in a frequency range of the signal output by the transmission signal generation unit 22 to pass therethrough, and is composed of a high-pass filter or a band-pass filter. A transmission time detection unit 30 for detecting a transmission time is connected to an output terminal of the transmission-signal band-pass unit 28. A position detection unit 17 is connected to an output terminal of the transmission time detection unit 30.

A position detection method will now be described with reference to FIG. 7. In FIG. 7, part (a) shows an output signal from a vibration-amplitude detection electrode S1. In addition, part (b) shows an internal signal of the transmission-signal band-pass unit 28. In the signal shown in part (a) that is output from the vibration-amplitude detection electrode S1, only a signal component in a frequency range of the signal output from the transmission signal generation unit 22 is allowed to pass through the transmission-signal band-pass unit 28. Part (c) of FIG. 7 shows an output signal from the transmission-signal band-pass unit 28. This signal is obtained by converting the signal shown in part (b) of FIG. 7 into a binary signal with a comparator using a threshold set at the central value of the signal shown in part (b) of FIG. 7.

Part (d) of FIG. 7 shows an output signal from the driving-member-side vibration detection portion 8 shown in FIG. 5. In addition, part (e) shows an internal signal of the transmission-signal band-pass unit 28. In the signal shown in part (d) that is output from the driving-member-side vibration detection portion 8, only a signal component in a frequency range of the signal output from the transmission signal generation unit 22 is allowed to pass through the transmission-signal band-pass unit 28. Part (f) of FIG. 7 shows an output signal from the transmission-signal band-pass unit 28. This signal is obtained by converting the signal shown in part (e) of FIG. 7 into a binary signal using a threshold set at the central value thereof. The transmission time detection unit 30 shown in FIG. 5 outputs the transmission time TD (transmission time of the vibration that does not contribute to the relative movement) on the basis of the signals shown in parts (c) and (f) of FIG. 7.

The position detection unit 17 calculates the position on the basis of the signal from the transmission time detection unit 30. The position detection unit 17 can determine the distance L on the basis of the detected transmission time TD in a manner similar to that in the second embodiment.

Thus, according to the present embodiment, the signal with such a frequency that the signal does not contribute to the relative movement between the vibration member and the driving member 7 is superposed on the signal with such a frequency that the signal contributes to the relative movement. Thus, the driving member 7 is relatively moved. Accordingly, the transmission time TD can be detected while the driving member is being driven in response to the signal with such a frequency that the signal contributes to the relative movement. In other words, according to the present embodiment, the transmission time TD is detected using the component of the signal output by the vibration-amplitude detection electrode S1 that represents a vibration component that does not contribute to the relative movement and the component of the signal output by the driving-member-side vibration detection portion 8 that represents a vibration component that does not contribute to the relative movement. Then, similar to the second embodiment, the relative position between the vibration member and the driving-member-side vibration detection portion 8 can be detected on the basis of the transmission time TD.

Fourth Embodiment

In the first to third embodiments, the vibration of the vibration member is detected by the vibration-amplitude detection electrode S1, and the signal output by the vibration-amplitude detection electrode S1 is used as a signal showing the vibrational state of the vibration member. In a fourth embodiment, the vibration-amplitude detection electrode S1 is not used, and the signal applied to the vibration member is directly used as the signal that shows the vibrational state of the vibration member. The distance L is detected on the basis of the signal applied to the vibration member and the signal output from a driving-member-side vibration detection portion 8. The structure of a vibration wave driven apparatus according to the present embodiment is shown in FIG. 8. The structure shown in FIG. 8 is similar to the structure of the first embodiment shown in FIG. 1 except that the vibration-member-side vibration detection circuit 19 is omitted.

Control Apparatus Structure 3

A control apparatus for the vibration wave driven apparatus shown in FIG. 8 includes a drive signal generation unit 21 that applies a signal to the vibration wave driven apparatus. A boosting circuit 31 is connected to an output terminal of the drive signal generation unit 21, so that a signal boosted by the boosting circuit 31 is applied to a piezoelectric element 5. The signal output from the drive signal generation unit 21 has such a frequency that the signal contributes to the relative movement between the vibration member and a driving member 7. The signal output from the drive signal generation unit 21 is applied to the piezoelectric element 5, so that vibration is applied to projection portions 6 and is transmitted to the driving-member-side vibration detection portion 8 through the driving member 7. A position detection unit 17 is connected to an output terminal of the drive signal generation unit 21. The position detection unit 17 has a function of detecting a phase difference between a signal output by a driving-member-side vibration detection circuit 18 and the signal applied by the drive signal generation unit 21.

The signal from the drive signal generation unit 21 is a rectangular wave, as shown in part (a) of FIG. 9. The signal from the drive signal generation unit 21 is boosted by the boosting circuit 31 shown in FIG. 8 and is applied to the piezoelectric element 5. If the signal from the driving-member-side vibration detection portion 8 is a sine wave in the time-amplitude graph as shown in part (b) of FIG. 9, the signal output from the driving-member-side vibration detection circuit 18 is a rectangular signal obtained by converting the signal shown in part (b) of FIG. 9 into a binary signal using a threshold set at the central value thereof, as in the time-amplitude graph shown in part (c) of FIG. 9. A detected vibration period T shown in part (b) of FIG. 9 is a period of the vibration shown in FIG. 2, and can be detected by a microcomputer or a logic circuit.

The delay time P (time difference between the signal applied by the drive signal generation unit 21 and the rectangular signal output by the driving-member-side vibration detection circuit 18) shown in part (c) of FIG. 9 is the time interval between the rising edge of the waveform of the signal applied by the drive signal generation unit 21 and the rising edge of the waveform of the signal from the driving-member-side vibration detection circuit 18. The delay time P can be determined by using a counter. The distance L can be determined in a manner similar to that in the first embodiment. The phase difference can also be calculated for signal components with different periods corresponding to frequencies that contribute to vibration by comparing the signal components with the same periods with each other. In the case where the thus-obtained phase difference information is used to determined the distance L, the detection accuracy can be increased.

Compared to the phase of the signal from the drive signal generation unit 21 used in the present embodiment, the phase of the signal from the vibration-amplitude detection electrode S1 used in the first embodiment is delayed because of the presence of the boosting circuit 31 and the piezoelectric element 5. In the case where this phase delay is to be taken into account, an accurate distance can be determined by subtracting the time corresponding to the phase delay from the delay time P. The present embodiment is advantageous in that the vibration-member-side vibration detection circuit can be omitted and the circuit can be simplified.

As described above, according to the fourth embodiment, instead of the signal from the vibration-amplitude detection electrode S1 used in the first embodiment, the signal from the drive signal generation unit 21 is used as the signal that shows the vibrational state of the vibration member in the position detection process. Also in the second and third embodiments, the relative position between the vibration member and the driving-member-side vibration detection portion 8 can be detected using the signal from the drive signal generation unit 21.

Fifth Embodiment

The structure of a control apparatus for a vibration wave driven apparatus according to a fifth embodiment will be described with reference to FIG. 10. According to the present embodiment, a plurality of driving-member-side vibration detection portions are provided. The structure shown in FIG. 10 is similar to the structure of the third embodiment except that a driving-member-side vibration detection portion 8b is additionally provided.

Referring to FIG. 10, a driving-member-side vibration detection portion 8a and the driving-member-side vibration detection portion 8b are provided on a driving member 7 at either end thereof. Vibration is applied to the driving member 7, which is in pressure contact with projection portions 6, in response to vibration of the projection portions 6. Then, the vibration is transmitted to the driving-member-side vibration detection portion 8a and the driving-member-side vibration detection portion 8b through the driving member 7. A driving-member length Ls shown in FIG. 10 is defined as the length of the driving member 7. The driving-member-side vibration detection portions 8a and 8b are composed of piezoelectric elements, and a transmission-signal band-pass unit 28 is connected to output terminals of the driving-member-side vibration detection portions 8a and 8b. A transmission-signal band-pass unit 28 has a function of allowing only a signal component in a frequency range of the signal output by a transmission signal generation unit 22 to pass therethrough, and is composed of a high-pass filter or a band-pass filter. A transmission time detection unit 30 for detecting a transmission time is connected to an output terminal of the transmission-signal band-pass unit 28. A position detection unit 17 is connected to an output terminal of the transmission time detection unit 30.

A position detection method will now be described with reference to FIG. 11. In FIG. 11, part (a) shows an output signal from a vibration-amplitude detection electrode. In addition, part (b) shows an internal signal of the transmission-signal band-pass unit 28. In the signal shown in part (a) that is output from the vibration-amplitude detection electrode, only a signal component in a frequency range of the signal output from the transmission signal generation unit 22 is allowed to pass through the transmission-signal band-pass unit 28. Part (c) of FIG. 11 shows an output signal from the transmission-signal band-pass unit 28. This signal is obtained by converting the signal shown in part (b) of FIG. 11 into a binary signal with a comparator using a threshold set at the central value of the signal shown in part (b) of FIG. 11.

Part (d) of FIG. 11 shows an output signal from the driving-member-side vibration detection portion 8a shown in FIG. 10. In addition, part (e) shows an internal signal of the transmission-signal band-pass unit 28. In the signal shown in part (d) that is output from the driving-member-side vibration detection portion 8a, only a signal component in a frequency range of the signal output from the transmission signal generation unit 22 is allowed to pass through the transmission-signal band-pass unit 28. Part (f) of FIG. 11 shows an output signal from the transmission-signal band-pass unit 28. This signal is obtained by converting the signal shown in part (e) of FIG. 11 into a binary signal using a threshold set at the central value thereof. The transmission time detection unit 30 shown in FIG. 10 outputs a transmission time TDa on the basis of the signals shown in parts (c) and (f) of FIG. 11.

Part (g) of FIG. 11 shows an output signal from the driving-member-side vibration detection portion 8b shown in FIG. 10. In addition, part (h) shows an internal signal of the transmission-signal band-pass unit 28. In the signal shown in part (g) that is output from the driving-member-side vibration detection portion 8b, only a signal component in a frequency range of the signal output from the transmission signal generation unit 22 is allowed to pass through the transmission-signal band-pass unit 28. Part (i) of FIG. 11 shows an output signal from the transmission-signal band-pass unit 28. This signal is obtained by converting the signal shown in part (h) of FIG. 11 into a binary signal using a threshold set at the central value thereof.

The transmission time detection unit 30 shown in FIG. 10 outputs a transmission time TDb on the basis of the signals shown in parts (c) and (i) of FIG. 11. The position detection unit 17 calculates the position on the basis of the signal from the transmission time detection unit 30.

Position Detection Unit Function 3

The position detection unit 17 determines the distance L on the basis of the ratio between the transmission time TDa and the transmission time TDb. The distance L can be calculated on the basis of the ratio between the transmission time TDa and the transmission time TDb and the driving-member length Ls as follows:

$$(\text{Distance } L) = ((\text{Transmission Time } TDa)/((\text{Transmission Time } TDa) + (\text{Transmission Time } TDb)))^* (\text{Driving-member Length } Ls) \quad (4)$$

Thus, in the present embodiment, a plurality of vibration detectors 8a and 8b are provided on the driving member 7 so that a plurality of transmission times can be obtained. Then, the relative position can be determined by comparing the transmission times with each other. In the above-described embodiments, the transmission speed in the material is used in the equation for determining the distance L. In contrast, according to the present embodiment, the transmission speed in the material is not used in the equation for determining the distance L since the ratio between the transmission times is used instead. Therefore, the distance L can be determined without being influenced by variations and differences caused by the temperature environment, and the detection accuracy can be increased. In addition, the structure of the present embodiment can also be applied to the first, second, and fourth embodiments. In such a case, the relative positions between the vibration member and the driving-member-side vibration detection portions can be determined by using a plurality of signals output by the driving-member-side vibration detection portions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-096146, filed Apr. 10, 2009, and Japanese Patent Application No. 2010-026728, filed Feb. 9, 2010, which are hereby incorporated by reference herein in its entirety.

The invention claimed is:

1. A control apparatus for a vibration wave driven apparatus, wherein the vibration wave driven apparatus includes
a vibration member including an electro-mechanical energy conversion element and an elastic member bonded to the electro-mechanical energy conversion element and provided with a projection portion, the vibration member exciting vibrations of two vibration modes in response to a drive signal applied to the vibration member, the vibrations of the two vibration modes being combined together to generate an elliptic motion of the projection portion, and a driving member including an end portion and moving relative to the vibration member by contacting the projection portion, and wherein the control apparatus detects the relative position between the vibration member and a driving-member-side vibration detection portion on a basis of a signal that shows a vibrational state of the vibration member and a signal output from the driving-member-side vibration detection portion provided on the driving member to detect a vibration of the driving member.

2. The control apparatus according to claim 1,
wherein the vibration detected by the driving-member-side vibration detection portion contributes to the relative movement between the driving member and the vibration member, and
wherein the control apparatus detects the relative position on the basis of the signal that shows the vibrational state of the vibration member and the signal that is output from the driving-member-side vibration detection portion and that represents the vibration that contributes to the relative movement.

3. The control apparatus according to claim 1,
wherein the vibration detected by the driving-member-side vibration detection portion does not contribute to the relative movement between the driving member and the vibration member, and
wherein the control apparatus detects the relative position on the basis of the signal that shows the vibrational state of the vibration member and the signal that is output from the driving-member-side vibration detection portion and that represents the vibration that does not contribute to the relative movement.

4. The control apparatus according to claim 1,
wherein a vibration that does not contribute to the relative movement between the driving member and the vibration member is superposed on a vibration that contributes to the relative movement in the vibration member, and
wherein the control apparatus detects the relative position on the basis of the signal that shows the vibrational state of the vibration member and a component of the signal output from the driving-member-side vibration detection portion, the component representing the vibration that does not contribute to the relative movement.

5. The control apparatus according to claim 1,
wherein the signal that shows the vibrational state of the vibration member is a signal applied to the vibration member, and
wherein the control apparatus detects the relative position on the basis of the signal applied to the vibration member and the signal output from the driving-member-side vibration detection portion.

6. The control apparatus according to claim 1,
wherein the signal that shows the vibrational state of the vibration member is a signal output from a vibration-member-side vibration detection portion provided on the vibration member to detect a vibration of the vibration member, and
wherein the control apparatus detects the relative position on the basis of the signal output from the vibration-member-side vibration detection portion and the signal output from the driving-member-side vibration detection portion.

7. The control apparatus according to claim 5,
wherein the control apparatus detects the relative position on the basis of a phase difference between the signal output from the driving-member-side vibration detection portion and either of the signal applied to the vibration member and the signal output from the vibration-member-side vibration detection portion.

8. The control apparatus according to claim 5,
wherein the control apparatus detects the relative position on the basis of a difference between the time at which the vibration of the driving member is detected by the driving-member-side vibration detection portion and either of the time at which a signal is applied to the vibration member and the time at which the vibration of the vibration member is detected by the vibration-member-side vibration detection portion.

9. The control apparatus according to claim 1,
wherein a plurality of the driving-member-side vibration detection portions are provided on the driving member, and
wherein the control apparatus detects the relative position on the basis of the signal that shows the vibrational state of the vibration member and a plurality of signals output from the driving-member-side vibration detection portions.

10. The control apparatus according to claim 2,
wherein the signal that shows the vibrational state of the vibration member is a signal applied to the vibration member, and
wherein the control apparatus detects the relative position on the basis of the signal applied to the vibration member and the signal output from the driving-member-side vibration detection portion.

11. The control apparatus according to claim 3,
wherein the signal that shows the vibrational state of the vibration member is a signal applied to the vibration member, and
wherein the control apparatus detects the relative position on the basis of the signal applied to the vibration member and the signal output from the driving-member-side vibration detection portion.

12. The control apparatus according to claim 4,
wherein the signal that shows the vibrational state of the vibration member is a signal applied to the vibration member, and
wherein the control apparatus detects the relative position on the basis of the signal applied to the vibration member and the signal output from the driving-member-side vibration detection portion.

13. The control apparatus according to claim 2,
wherein the signal that shows the vibrational state of the vibration member is a signal output from a vibration-member-side vibration detection portion provided on the vibration member to detect a vibration of the vibration member, and
wherein the control apparatus detects the relative position on the basis of the signal output from the vibration-member-side vibration detection portion and the signal output from the driving-member-side vibration detection portion.

14. The control apparatus according to claim 3,
wherein the signal that shows the vibrational state of the vibration member is a signal output from a vibrationmember-side vibration detection portion provided on the vibration member to detect a vibration of the vibration member, and wherein the control apparatus detects the relative position on the basis of the signal output from the vibration-member-side vibration detection portion and the signal output from the driving-member-side vibration detection portion.

15. The control apparatus according to claim 4, wherein the signal that shows the vibrational state of the vibration member is a signal output from a vibration-member-side vibration detection portion provided on the vibration member to detect a vibration of the vibration member, and wherein the control apparatus detects the relative position on the basis of the signal output from the vibration-member-side vibration detection portion and the signal output from the driving-member-side vibration detection portion.

16. The control apparatus according to claim 6, wherein the control apparatus detects the relative position on the basis of a phase difference between the signal output from the driving-member-side vibration detection portion and either of the signal applied to the vibration member and the signal output from the vibration-member-side vibration detection portion.

17. The control apparatus according to claim 6, wherein the control apparatus detects the relative position on the basis of a difference between the time at which the vibration of the driving member is detected by the driving-member-side vibration detection portion and either of the time at which a signal is applied to the vibration member and the time at which the vibration of the vibration member is detected by the vibration-member-side vibration detection portion.

18. The control apparatus according to 2, wherein a plurality of the driving-member-side vibration detection portions are provided on the driving member, and wherein the control apparatus detects the relative position on the basis of the signal that shows the vibrational state of the vibration member and a plurality of signals output from the driving-member-side vibration detection portions.

19. The control apparatus according to 3, wherein a plurality of the driving-member-side vibration detection portions are provided on the driving member, and wherein the control apparatus detects the relative position on the basis of the signal that shows the vibrational state of the vibration member and a plurality of signals output from the driving-member-side vibration detection portions.

20. The control apparatus according to 4, wherein a plurality of the driving-member-side vibration detection portions are provided on the driving member, and wherein the control apparatus detects the relative position on the basis of the signal that shows the vibrational state of the vibration member and a plurality of signals output from the driving-member-side vibration detection portions.

* * * * *